UNITED STATES PATENT OFFICE.

CHARLES ERNEST ACKER, OF NEW YORK, N. Y., ASSIGNOR TO THE NITROGEN COMPANY, A CORPORATION OF NEW YORK.

ELECTROLYTE FOR THE PRODUCTION OF ALKALI AND ALKALINE-EARTH METALS.

1,142,220. Specification of Letters Patent. Patented June 8, 1915.

No Drawing. Original application filed August 5, 1910, Serial No. 575,819. Divided and this application filed October 30, 1914. Serial No. 869,404.

*To all whom it may concern:*

Be it known that I, CHARLES E. ACKER, a citizen of the United States, residing at the city of New York, in the county of Westchester and State of New York, have invented certain new and useful Improvements in Electrolytes for the Production of Alkali and Alkaline-Earth Metals, of which the following is a full, clear, and exact description.

This invention relates to the production of alkali and alkaline-earth metals by electrolysis, and has for its objects the provision of an electrolyte for use in the secondary electrolytic cell whereby such metals may be produced more economically and efficiently than heretofore, the present application being a division of my application, Serial Number 575,819, which discloses the process in which the electrolyte is to be used.

United States Patent to Edgar A. Ashcroft, No. 801,199 dated October 10, 1905, discloses a process for the production of alkali metals; sodium being obtained by electrolyzing fused sodium chlorid over a molten lead cathode, thereby producing an alloy of lead and sodium, such alloy being thereafter employed while still molten as an anode in connection with an electrolyte in a secondary electrolytic cell consisting of fused sodium hydroxid or fused sodium chlorid; the cathode in this latter operation being of iron or nickel and the alkali metal being liberated thereat, subsequently rising to the surface of the secondary electrolyte from whence it may be drawn off.

I have found in practice that the above described process is open to a number of serious objections which have been brought into notice in attempting to use the various substances heretofore proposed for use as electrolytes in the secondary electrolytic cell. While sodium hydroxid, chlorid, bromid or iodid, may be used alone on a small scale or in a laboratory to effect the production of sodium in the manner above described, such electrolytes, and in fact all others that have thus far been mentioned or proposed for this purpose, fail to measure up to the commercial requirements. However, I have discovered, that both alkali and alkaline-earth metals may be obtained at a high efficiency as a result of electrolysis in the secondary cell at a convenient and economical temperature if the electrolyte comprises a metallic compound, containing carbon and nitrogen, such for example as the corresponding metal cyanid or cyanamid, or of a stronger cyanid or cyanamid, or a mixture of such salts, and that by the use of such an electrolyte no portion of the heavy metal in the alloy can be carried along as an impurity. I thus not alone improve the product, but I further obviate the necessity for the very careful regulation of temperature, current density and composition of alloy necessitated by the use of the electrolytes heretofore proposed. In producing metallic sodium I regard an electrolyte containing as its essential constituent sodium cyanid as the best electrolyte for use in the secondary electrolytic cell; but potassium cyanid or mixed sodium and potassium cyanids may also be employed owing to the fact that potassium cyanid is a stronger compound than sodium cyanid and is not decomposed by metallic sodium. I have discovered that an electrolyte containing as its essential constituent potassium cyanid is the most suitable cyanid for the production of the metal potassium. In the above electrolytes the corresponding cyanamid salt may be substituted for cyanid, or a mixture of such cyanamids and cyanids may be employed.

In the production of metallic lithium, calcium, barium, or strontium by this process, sodium or potassium cyanid may be employed as the essential element of the electrolyte, at the beginning of the operation, but the liberated metal—lithium, calcium, barium, or strontium—will reduce the molten cyanid in whole or in part, in course of time, to the corresponding cyanamid salt, that is to say, sodium or potassium cyanamid. These electrolytes containing molten cyanids and cyanamids constitute admirable electrolytes in connection with anodes of lead-sodium, lead-potassium, lead-barium, lead-lithium, or of any other suitable heavy metal, such, for example, as tin, combined with an alkali or alkaline-earth metal, for the reason that the heavy metals do not form corresponding salts which can exist at the temperature of the operation,—normally a moderate red heat,—the only stable cyanids or cyanamids at red heat being those of alkali or alkaline-earth metals; and further, that neither the heavy metals nor alkali or alkaline-earth metals are soluble in molten cyanid or cyanamid. The molten alkali cyanids and cyanamids, too, are especially suitable for use in electrolytes, because of their low melting points, and great fluidity, and the fact that no narrow limits of temperature are necessary, which obviates the necessity for extremely careful regulation.

The use of a cyanid is free from objection for the reason that should any molten cyanid run out into the air or should such substance escape in the form of vapor, it would immediately burn to cyanate, which is harmless; and no odor of hydrocyanic acid is apparent, for the reason that the cyanid is not used in solution and there is no hydrolysis. The cyanamids are harmless.

The molten metallic cathode should be a body of metal large enough to act as a storage reservoir for the alkali or alkaline-earth metal, as well as for heat; and it may ordinarily contain from 5% to 25% by weight of the light metal. It should be kept in constant circulation and this circulation should not be too sluggish in order to preserve an effective balance between the respective cells. This makes it possible to run either half of the furnace for several hours, while the other half is short circuited; and especially does it tend to equalize the temperature throughout the whole apparatus. This is particularly true when the apparatus is compact and well inclosed in non-conducting brick work, or other heat insulating material, resulting in a conservation of the energy required throughout the process. It may be here noted that the provision of an electrolyte comprising a suitable metal cyanid or cyanamid, permits of this particularly desirable feature since it allows the secondary cell to be operated at the same or substantially the same temperature as the primary. The principal source of electrical heat should be in the primary bath and the voltage and current density should there be relatively high. If the temperature of the primary bath is 750° C., the temperature of the circulating alloy throughout the furnace will be approximately 750° C., and the temperature of this moving body of metal will determine to a large extent the temperature of the operation in the secondary furnace, which will ordinarily be but very slightly lower than that of the moving metal; but the temperature of the secondary electrolyte may be, in fact, maintained as much as 100° C. lower than that in the primary, if desired, by employing a very low current density in the secondary, by exposing a part of the furnace of heat radiation in the air, by conducting some of the heat away through an extra heavy cathode with outside copper connections, etc. Here again the use of an electrolyte containing alkali cyanids and cyanamids is beneficial owing to their low melting points, which, of course, permits the electrolyte to remain fluid over a large range of temperature.

The process in which the electrolyte is to be used may be carried out either intermittently or continuously in the double compartment furnace, as is described in my parent application; or the two compartments or cells may be entirely distinct and separate from each other;—that is, the alloy may be made in one furnace and afterward transferred bodily to a separate furnace and there decomposed.

In operation, should it be decided to manufacture simply sodium, so that such material may be accumulated, sodium chlorid, for example, would be electrolyzed by suitable current in the primary cell, chlorin being evolved and passing off, while the sodium combines with the lead or other heavy metal which forms the cathode in the primary cell, to form the lead-sodium alloy. This alloy in turn becomes the anode of the secondary cell, molecules of the sodium-cyanid therein being momentarily disassociated, the released sodium being deposited upon the cathode while the cyanogen anions combine with fresh sodium from the surface of the alloy, the accumulated sodium upon the cathode rising to the surface of the electrolyte from whence it may be drawn off continuously or intermittently; and the electrolyte hence remaining substantially unconsumed. This action is the same with all of the alkali metals, such for example as sodium, potassium, lithium, etc., when the electrolyte in the secondary cell contains a cyanogen compound of the metal to be produced.

In conclusion I particularly wish also to call attention to the low melting points of the cyanids, which are considerably below the temperature required for the formation of the alloy. These compounds, too, being free from water or water-forming constituents and also being non-halogen compounds are not subject to the objection hereinbefore referred to, to wit, a liability to attack the heavy metal of the alloy, to form soluble compounds therewith at the temperature of the operation, which temperature as aforesaid approximates a red-heat.

I claim:

1. An electrolyte for use in the production of alkali and alkaline-earth metals containing as its essential constituent a fused compound of the metal to be produced containing carbon and nitrogen.

2. An electrolyte for use in the production of alkali and alkaline-earth metals containing as its essential constituent a compound of the metal to be produced containing a carbon and nitrogen radical.

3. An electrolyte for use in the production of alkali and alkaline-earth metals containing as its essential constituent a cyanogen compound of the metal to be produced.

4. An electrolyte for use in the production of alkali metals containing as its essential constituent an alkali cyanid.

5. An electrolyte for use in the production of sodium, containing as its essential constituent sodium cyanid.

6. An electrolyte for use in the production of an alkali and alkaline earth metal containing as its essential constituent a cyanid compound of the metal to be produced.

In witness whereof, I subscribe my signature, in the presence of two witnesses.

CHARLES ERNEST ACKER.

Witnesses:
WILLIAM HEAGLE,
KENNETT G. ACKERLY.